United States Patent [19]
Shirai

[11] Patent Number: 6,104,924
[45] Date of Patent: *Aug. 15, 2000

[54] VIRTUAL TERMINAL PROTOCOL USING TEXT MESSAGING

[75] Inventor: Kazuhiko Shirai, San Diego, Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/679,589

[22] Filed: Jul. 15, 1996

[51] Int. Cl.$^7$ ...................................................... H04M 3/00
[52] U.S. Cl. ........................... 455/418; 455/466; 455/566
[58] Field of Search ..................................... 455/418–420, 455/550, 556–558, 564, 565–566, 575, 466

[56] References Cited

U.S. PATENT DOCUMENTS

| | | | |
|---|---|---|---|
| 5,201,067 | 4/1993 | Grube et al. .............................. | 455/566 |
| 5,418,837 | 5/1995 | Johansson et al. ...................... | 455/418 |
| 5,425,077 | 6/1995 | Tsoi ......................................... | 455/566 |
| 5,479,476 | 12/1995 | Finke-Anlauff .......................... | 455/418 |
| 5,638,412 | 6/1997 | Blakeney, II et al. ..................... | 455/69 |
| 5,794,142 | 8/1998 | Vanttila et al. .......................... | 455/419 |
| 5,797,103 | 8/1998 | Dula ........................................ | 455/466 |

FOREIGN PATENT DOCUMENTS

| | | |
|---|---|---|
| 0562890A1 | 9/1993 | European Pat. Off. . |
| WO94/30023 | 12/1994 | WIPO . |

*Primary Examiner*—Nguyen Vo
*Attorney, Agent, or Firm*—Frommer Lawrence & Haug, LLP.; William S. Frommer; Gordon Kessler

[57] ABSTRACT

A virtual terminal protocol for a mobile station and a fixed station which initializes the mobile station by transmitting from the fixed station a terminal capabilities inquiry, transmitting from the mobile station a terminal capabilities response in response to the terminal capabilities inquiry, transmitting from the fixed station in text messages a selected plurality of scripts in response to the terminal capabilities response, and storing in the mobile station the scripts transmitted by the fixed station. The protocol provides for mobile station originated script action in which a script is invoked at the mobile station, which involves the display of menu options and the selection by a user of one of those options. The protocol also provides for fixed station originated script action in which the fixed station transmits a script invocation request to the mobile station and the mobile station invokes a script in response to the script invocation request.

9 Claims, 3 Drawing Sheets

```
icons. . . . . . .
Call Forward
1: Always
2: Not Avail.
3: Scheduled
```

Figure 1 icons. . . . . . .
123456789012
123456789012
123456789012
123456789012

Figure 2 icons. . . . . . .
Call Forward
1: Always
2: Not Avail.
3: Scheduled

Figure 3 icons. . . . . . .
Fwd Always
1: to V-Mail
2: to Home
3: to new #

Reference Models

VIRTUAL TERMINAL PROTOCOL USING TEXT MESSAGING

BACKGROUND OF THE INVENTION

The present invention relates to a virtual terminal protocol using SMS (short message services) text messaging and, more particularly, a protocol for communication of the specification of the user interface of cellular/PCS (personal communication service) phones via SMS text messages.

As is known, various systems, including the cellular systems GSM (Global System for Mobile) text Short Message Services, CDMA and TDMA North American digital cellular system standards, etc., have been developed for digital cellular communication. GSM consists of many subsystems including the mobile station (MS), the base station (BS), also referred herein as the fixed station (FS), the network and switching subsystem (NSS) and the operation subsystem (OSS). The mobile station generally is a stand-alone piece of equipment, such as a cellular portable telephone, a cellular mobile telephone, a PCS (personal communication service) telephone, etc., or another terminal instrument that incorporates the cellular/PCS telephone module, such as the interface for a personal computer or fax. The base station connects to the mobile station through a radio interface and also connects to the network and switching subsystem. For purposes herein, the fixed station is either a wireless network infrastructure or a separate computer host that interacts with the mobile station.

OBJECTS OF THE INVENTION

It is an object of the present invention to provide a virtual terminal protocol using SMS text messaging for communication of "scripts" to a mobile station from a fixed station so as to design the mobile station's user interface.

Another object of the present invention is to provide a virtual terminal protocol which defines the prompt/menu/softkey presentation for a mobile station. Such presentation can be either for network features such as CLASS, call forwarding, call screening, etc., or for computer (host) to mobile (or portable) terminal application software.

A further object of the present invention is to provide a protocol which enhances text messaging SMS so as to provide a two-way "canned" response messaging capability despite the mobile station's hardware limitations, such as the limited number of buttons and the limited size of its display.

Various other objects, advantages and features of the present invention will become readily apparent to those of ordinary skill in the art, and the novel features will be particularly pointed out in the appended claims

SUMMARY OF THE INVENTION

In accordance with one embodiment of the present invention, a communication protocol involves transmitting from a fixed station to a mobile station a terminal capabilities inquiry, transmitting from the mobile station a terminal capabilities response to the fixed station in response to reception of the terminal capabilities inquiry at the mobile station, transmitting from the fixed station a selected plurality of scripts to the mobile station in response to reception of the terminal capabilities response, receiving and storing in the mobile station the plurality of scripts transmitted by the fixed station, and operating the mobile station in accordance with the stored plurality of scripts.

As one aspect of the present invention, the user interface of the mobile station is controlled in accordance with user interface data included in an invoked script.

As another aspect of the present invention, the fixed station transmits the scripts via a text message transmission, such as short message services text messaging, to the mobile station.

In accordance with another embodiment of the present invention, a communication protocol involves invoking at the mobile station a script stored in the mobile station, displaying at the mobile station a menu associated with the invoked script, selecting by a user one of the options in the menu, and executing the selected option.

As one aspect of this embodiment, one of the user options is the transmission from the mobile station to the fixed station of a message via a text message transmission (e.g., short message services text messaging).

In accordance with a further embodiment of the present invention, a communication protocol involves transmitting from the fixed station a script invocation request (over a text message transmission) to the mobile station, receiving the script invocation request at the mobile station, and invoking one of the scripts stored in the mobile station in response to the received script invocation request.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a schematic illustration of the generic display format of the mobile station;

FIG. 2 is a schematic illustration of an exemplary call forwarding menu displayed on the mobile station in accordance with the present invention;

FIG. 3 is a schematic illustration of a call forwarding submenu displayed on the mobile station in accordance with the present invention;

DETAILED DESCRIPTION OF CERTAIN PREFERRED EMBODIMENTS

Figure 4:
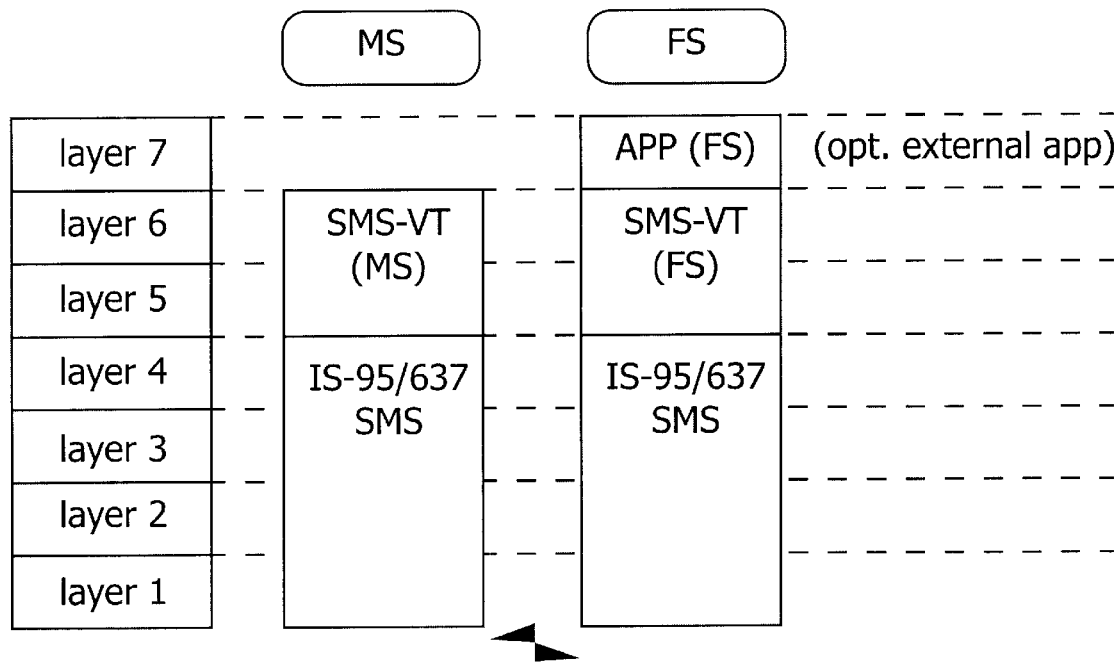
FIG. 4 is a schematic diagram of a layer model of the present invention.

SMS (short message services) allows for the wireless transmission of alphanumeric messages (e.g., 160 characters long) between the mobile station (e.g., cellular telephone) and the fixed station. The two general types of SMS messages are mobile-originating short messages and mobile-terminating short messages.

In accordance with the present invention, the mobile station operates as a virtual terminal (VT) as defined by the SMS-VT protocol of the present invention which uses SMS text messaging. The SMS-VT protocol is a session/presentation layer protocol which interacts with the end user operating the mobile station. The protocol's primary capability is to transmit information from a fixed station to a mobile station so as to define the user interface of that mobile station and, thus, the protocol is considered as a layer 6 (presentation) functionality in OSI (open system interconnection) terminology. SMS-VT further provides the capability to define the call processing status for each VT scenario. Here, SMS-VT will consist of sessionless (stand alone) prompt reply interactions and, thus, is considered as a weak layer 5 (session) functionality.

One of the main functions of the protocol of the present invention is to provide message format definitions that are transmitted from the fixed station to the mobile station. The message format definitions are transported to the mobile station via the well-known text message tele-services of SMS.

Referring now to the drawings, FIG. 1 illustrates the generic display format of the mobile station, wherein the display is comprised of four text lines of 12 characters each all located below a line of fixed pictorial icons. However, it is appreciated that other display designs are equally suitable.

In accordance with the present invention, an application of the SMS-VT protocol is to provide a user interface front end for various user initiated operations to be performed at the mobile station. The user interface includes both the display screen formats of the mobile station and the response selections by the mobile station user. FIG. 2 illustrates an exemplary top menu display, as defined by SMS-VT, of the mobile station corresponding to a call forwarding operation in which the user of the mobile station selects one of the options displayed in the "call forward" top menu. The call forwarding top menu is presented to a user by means of an SMS-VT "script" which is stored in the mobile station. An exemplary script which is stored in the mobile station and which provides the call forwarding menu to the user when the script (e.g., script 99) is "invoked" or "activated" is as follows:

script_id=99:
text_line [1]="Call Forward":
text_line [2]="1:Always" associated_with_action script_id [98] by button "1":
text_line [3]="2:Not Avail." associated_with_action script_id [97] by button "2":
text_line [4]="3:Scheduled" associated_with_action script_id [96] by button "3":
end_script [99 ]:

The mobile station, when the above call forwarding top menu script is activated (invoked), displays the four lines of text shown in FIG. 2 located below the "icons" line. The user of the mobile station selects one of the menu options by depressing on the mobile station keypad either button "1", button "2" or button "3". If the user depresses, for example, button "1", script number 98 (script_id [98]) is invoked in accordance with the code of script 99 listed above. Similarly, script 97 is invoked when button "2" is depressed and script 96 is invoked when button "3" is depressed.

Submenus and sub-submenus are provided to the user of the mobile station by means of other scripts that are stored in the mobile station. FIG. 3 illustrates a user interface submenu for call forwarding when the user responds to the call forwarding top menu by depressing the "1" button on the mobile station keypad, as previously discussed. An exemplary script which provides the call forwarding submenu shown in FIG. 3 is:

script_id=98:
text_line [1]="1:to V-Mail" associated_with_action new_call "*721800myvmail" then exit by button "1":
text_line [2]="2:to Home" associated with_action new_call "*721619myhmnum" then exit by button "2":
text_line [3]="3:to new #" associated_with_action script_id [95] by button "3": end_script [98]:

When script 98 is invoked, the user is instructed to indicate where a call is to be forwarded.

Other telephony call processing services also are provided to the mobile station by means of other SMS-VT scripts. In addition, the above exemplary scripts are shown herein in logical design notation. However, actual coding of the scripts is optimized for capacity efficiency taking into account the maximum length of SMS text message transmissions, as well as other technical constraints.

The SMS-VT protocol of the present invention supports various types of display screen dialogues, including the utilization of menus with number tags 0 and 1–9. Longer lists can be scrolled using the "*" and "#" buttons on the mobile station keypad. The display screen dialogues also can include multiple choice selections using [OK] and [next] softkeys, wherein the softkey labels can be customized.

SMS-VT supports various types of actions including: (1) call origination to predetermined numbers stored in the scripts themselves; (2) call origination to user-specified numbers; (3) DTMF in-band signalling during a call; (4) FLASH/FLASH-W/INFO CP messages; (5) link to other screens (e.g., other SMS-VT scripts) and (6) mobile originated SMS transmissions to the fixed station. Applications that are not directly associated with the wireless telephony network also are supported by SMS-VT provided that the necessary information is supplied to the mobile or fixed station. For example, the internet SMTP Gateway that translates E-mail addresses (e.g., {phone #}@ {area code}.{carrier}.net) to wireless terminal addressing might have to be provided for personal messaging. Other custom specific application software interfaces similarly may require additional information. That is, the fixed station addressability beyond the telephony network may have to be provided for applications that are not directly associated with the wireless telephony network.

As previously discussed, SMS-VT is considered as a layer 6 (presentation) functionality in OSI terminology since the SMS-VT protocol provides the capability to transmit information to a mobile station so as to design the mobile station's user interface. SMS-VT also is considered as a layer 5 (session) functionality in that it provides the capabilities to define the call processing status for each VT scenario. FIG. 4 is a schematic illustration of a layer model of the SMS-VT protocol. As shown, layers 1 to 4 involve the existing SMS protocol and generally provide the functions of transmission, radio resource management, mobility management and communication management. In accordance with the present invention, SMS-VT is the protocol for layers 5 and 6 which provide the functionalities of session and presentation, respectively. Layer 7 is the application layer. Since layer modeling is well known in the art, further description thereof is omitted herein.

Figure 5:
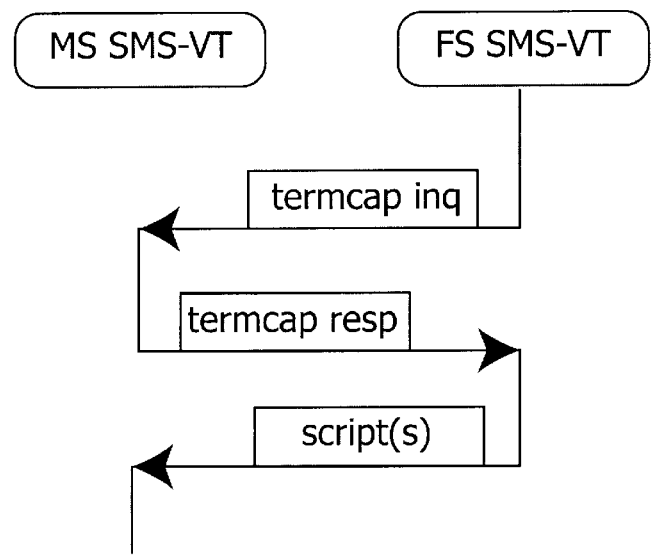
FIG. 5 is a schematic illustration of the initialization procedure of the SMS virtual terminal (SMS-VT) protocol.

The initialization procedure of SMS-VT in accordance with the present invention is illustrated in FIG. 5. Initialization of SMS-VT involves the downloading of the SMS-VT scripts from the fixed station to the mobile station. The initialization process generally can be initiated by the fixed station anytime assuming SMS transport (which is well known in the art) can be used. Also, at the transport layer, the acknowledgement of each message delivery to/from the mobile station is achieved at the lower SMS layer. The initialization process occurs after the mobile station is activated and generally after the availability of application features.

Referring to FIG. 5, the fixed station, operating under the SMS-VT protocol, supplies a "terminal capabilities" inquiry (termcap inq) to the mobile station. In response to the terminal capabilities inquiry, the mobile station supplies a terminal capabilities response (termcap resp) to the fixed station (via SMS) which includes therein the capabilities of the mobile station. The SMS-VT protocol, at the fixed station, determines the mobile station's ability to support the SMS-VT, and the fixed station supplies to the mobile station the appropriate scripts which the mobile station is capable of utilizing. The mobile station stores the supplied scripts in its memory. If the fixed station determines that the mobile station is not capable of interpreting the message formats that are specific to SMS-VT, the fixed station switches to alternative SMS messages that can be interpreted by the mobile station and subsequently read by the user thereof. For example, separate help messages can be supplied to the mobile station if its user is unable to interpret the display screen format and/or textual content.

Figure 6:
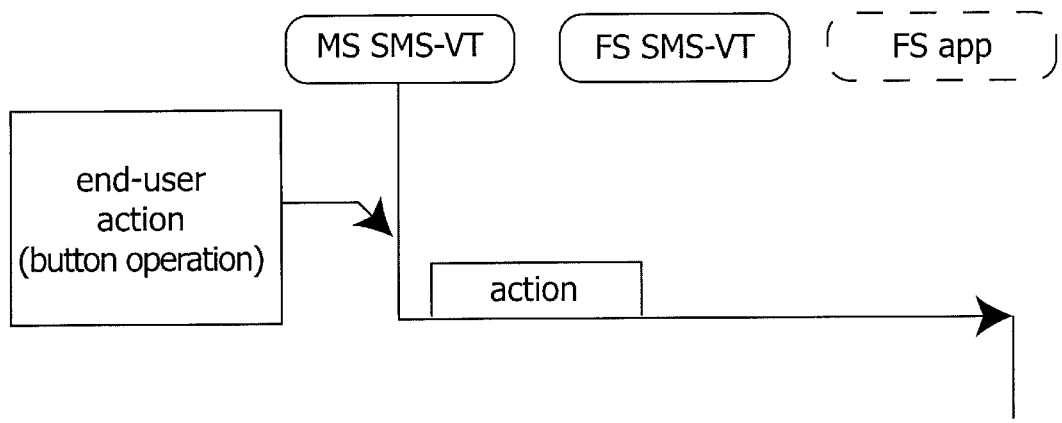
FIG. 6 is a schematic illustration of the SMS-VT procedure of a mobile station originated script action.

SMS-VT of the present invention supports mobile station originated script action in which the user of the mobile station initiates an action via a button operation on the mobile station keypad, at which time the corresponding or appropriate script stored in the mobile station is activated. FIG. 6 is a schematic illustration of a mobile station originated script action. The following identifies at least some of the actions that can be initiated by the user of the mobile station: (1) call origination to a predetermined number that is preprogrammed in an invoked script; (2) call origination to a user specified number; (3) DTMF in-band signaling during a call; (4) FLASH/FLASH-W/INFO CP messages; (5) link to other screens (i.e., activate other SMS-VT scripts); and (6) origination of SMS transmissions to the fixed station.

Mobile station originated script action also can be used in the following applications: network feature registration/activation/invocation (such as 3WC invocation), CFU/CFB/CFD/CFNA registration/activation, CW registration/activation/invocation, and distinctive ringing registration, as well as mobile originated SMS text messaging. Since these particular applications are well known in the art, further description thereof is omitted herein.

Figure 7:
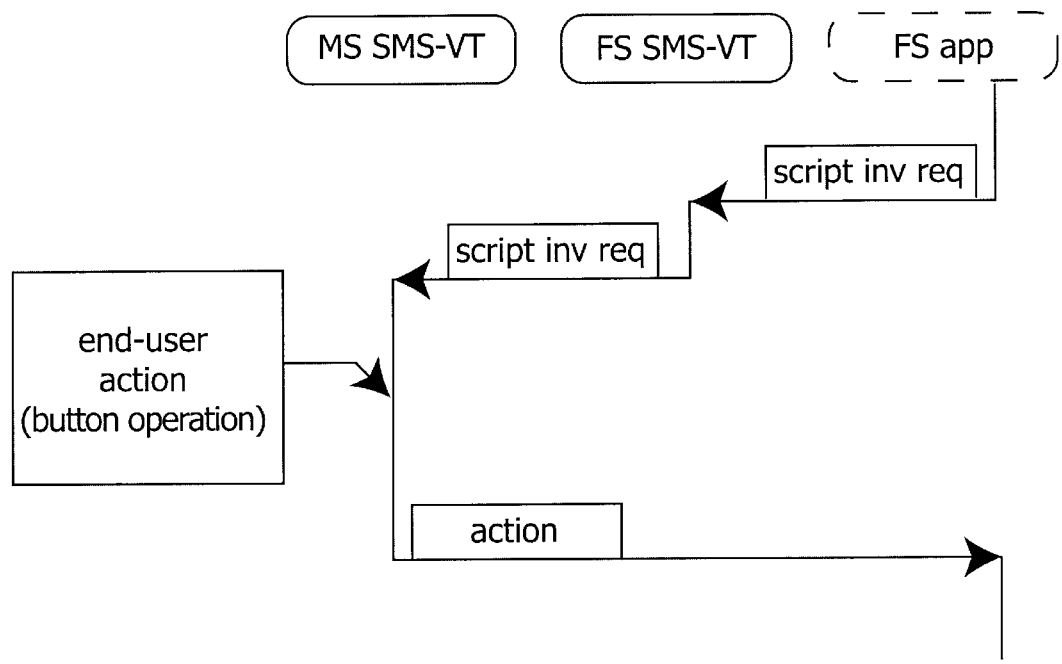
FIG. 7 is a schematic illustration of the SMS-VT procedure of a fixed station originated script action.

SMS-VT also supports fixed station application initiation of a script in the mobile station (i.e., fixed station originated script action). As shown in FIG. 7, a fixed station application requires the fixed station to transmit a "script invocation" request (script inv req) to the mobile station which, in response to the receipt thereof, invokes (i.e., activates) the appropriate script (as identified in the script invocation request). Any one of the actions mentioned above may be activated by the mobile station in response to a fixed station request. Pre-defined response SMS two-way text messaging also is supported for fixed station originated script action.

It is seen from the above description that the SMS-VT protocol of the present invention provides the capability to control the mobile station to operate as a remote terminal of the fixed station. Furthermore, the SMS-VT protocol provides the mobile station with the capability of easily carrying out various telephony call processing services, for example, call forwarding.

While the present invention has been particularly shown and described in conjunction with preferred embodiments thereof, it will be readily appreciated by those of ordinary skill in the art that various changes may be made without departing from the spirit and scope of the invention. For example, although a protocol for use with the SMS has been described herein, the present invention is not limited to the SMS, and defines virtual terminal protocols for use with other cellular and cordless phone protocols, for example, NA-TDMA, CDMA, PDC, 1800-DCS, DECT and CT-2.

As another example, although the present discussion is directed to cellular telephones, the present invention is not solely limited thereto and may be widely applied to beepers and other types of wireless communicating devices, as well as non-wireless communicating devices which have relatively simple transmission capabilities such as telephone receivers, cable television receivers, etc.

Still further, although only call forwarding has been described herein as a telephony service for which SMS-VT provides the user interface, call forwarding merely is one of many different telephony services for which SMS-VT can provide the user interface.

Therefore, it is intended that the appended claims be interpreted as including the embodiments described herein, the alternatives mentioned above, and all equivalents thereto.

What is claimed is:

1. A method of communicating between a particular target mobile station and a fixed station to establish an individualized, custom operating mode of the mobile station where the capabilities of the mobile station are at first unknown to the fixed station, comprising the steps of:

transmitting from the fixed station a terminal capabilities inquiry to the mobile station in order to determine the unknown capabilities of the mobile station;

receiving at the particular target mobile station the transmitted terminal capabilities inquiry;

transmitting without user input from the particular target mobile station to the fixed station a terminal capabilities response indicating the specific capabilities of the particular target mobile station in response to receipt of the terminal capabilities inquiry;

receiving at the fixed station the transmitted terminal capabilities response;

transmitting from the fixed station at least one script in response to the received terminal capabilities response including instructions for implementing at least one specific capability indicated in said terminal capabilities response;

receiving and storing in said mobile station said at least one script transmitted by the fixed station; and operating the mobile station in accordance with the stored at least one script and receiving a user input to aid in configuring the operating features of the mobile station to select and implement at least one specific capability indicated in said terminal capabilities response without further contact with said fixed station.

2. The method of claim 1, wherein the mobile station includes a user interface, and each of the at least one script transmitted to the mobile station includes user interface data operable to define the user interface of the mobile station.

3. The method of claim 2, further comprising the steps of invoking one of said at least one script stored in the mobile station; and controlling the user interface of the mobile station in accordance with the user interface data included in the invoked script.

4. The method of claim 1, wherein the fixed station transmits the at least one script to the mobile station via a wireless text message transmission.

5. The method of claim 4, wherein the wireless text message transmission from the fixed station to the mobile station is short message services text messaging.

6. The method of claim 1, further comprising the steps of:

transmitting from the fixed station a script invocation request to the mobile station;

receiving said script invocation request at the mobile station; and invoking a selected one of said at least one script stored in the mobile station in response to the received script invocation request, thereby allowing a user input in response to at least one inquiry of the invoked script to aid in adjusting the operating configuration of the mobile unit.

7. The method of claim 6, wherein the fixed station transmits the script invocation request to the mobile station via a wireless text message transmission.

8. The method of claim 1, further comprising the step of invoking a selected one of the at least one script stored in the mobile station.

9. The method of claim 8, wherein the step of invoking a selected script is carried out by displaying at the mobile station a menu associated with the selected script and having at least one user option, selecting by a user one of said at least one user option, and executing at the mobile station an instruction corresponding to the selected user option.

* * * * *